US006542299B2

(12) United States Patent
Sato et al.

(10) Patent No.: US 6,542,299 B2
(45) Date of Patent: Apr. 1, 2003

(54) MATERIAL FOR BISMUTH SUBSTITUTED GARNET THICK FILM AND A MANUFACTURING METHOD THEREOF

(75) Inventors: Tadakuni Sato, Sendai (JP); Kazumitsu Endo, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 09/874,097

(22) Filed: Jun. 5, 2001

(65) Prior Publication Data

US 2001/0052828 A1 Dec. 20, 2001

(30) Foreign Application Priority Data

Jun. 6, 2000 (JP) ....................................... 2000-169308

(51) Int. Cl.[7] ............................ G02B 27/28; G02B 5/30
(52) U.S. Cl. ............................ 359/484; 117/54; 117/56
(58) Field of Search ......................... 359/484; 423/594; 117/11, 54, 89, 56

(56) References Cited

U.S. PATENT DOCUMENTS 5,662,740 A * 9/1997 Yamasawa et al. ........... 117/11

FOREIGN PATENT DOCUMENTS

DE 23 18 798 10/1973
GB 1 441 353 6/1976
JP 11 236297 8/1999

OTHER PUBLICATIONS

Klages et al. (1983) "LPE Growth of Bismuth Substituted Gadolinium Iron Garnet Layers: Systematization of Experimental Results", *Journal of Crystal Growth*, vol. 64, pp. 275–284.

Wood et al., "Effect of Impurities on the Optical Properties of Yttrium Iron Garnet", *Journal of Applied Physics*, vol. 38(3), pp. 1038–1045.

* cited by examiner

*Primary Examiner*—Thong Nguyen
*Assistant Examiner*—Alessandro V. Amari
(74) *Attorney, Agent, or Firm*—Collard & Roe, P.C.

(57) ABSTRACT

A material for a bismuth substituted garnet thick film comprising Gd, Yb, Bi, Fe and Al as the main ingredient grown by a liquid phase growing method on a garnet substrate in which the composition of the garnet thickness is represented by the general formula:

$$Gd_{3-x-y}Yb_xBi_yFe_{5-z}Al_2O_{12}$$

($0<x\leqq0.5$, $0.85\leqq y\leqq1.55$ and $0.15\leqq z\leqq0.65$), and each of boron oxide ($B_2O_3$) and lead oxide (PbO) is contained by from 0 to 4.0 wt % (not including 0) in the garnet thick film.

7 Claims, 5 Drawing Sheets

$Gd_{1.7}Yb_{0.2}Bi_{1.1}Fe_{5-z}Al_{z}O_{12}$ $Gd_{1.9-X}Yb_XBi_{1.1}Fe_{4.6}Al_{0.4}O_{12}$

MATERIAL FOR BISMUTH SUBSTITUTED GARNET THICK FILM AND A MANUFACTURING METHOD THEREOF

BACKGROUND OF THE INVENTION

1. Field of the Invention

This invention relates to a bismuth (Bi) substituted garnet among optical garnet materials having a Faraday rotation effect and a manufacturing method thereof and, more specifically, to a single crystal thick film of GdBi series garnet grown by a liquid phase growing method and a manufacturing method thereof.

2. Statement of Related Art

Heretofore, devices based on the Faraday rotation effect have been developed and put into practical use in the light communication or optical information processing. In light communication apparatus using semiconductor laser oscillators, when reflection light from optical fiber cables or connectors return to laser oscillation portions, noises increase to make the oscillators. Therefore, an optical isolator utilizing the Faraday rotation effect has been used in order to ensure oscillation the state by shutting return light.

Bi substituted type rare earth garnets having a large Faraday rotation effect been grown by an LEP method, flux method or the like and used for isolators in near infrared regions.

Particularly, since garnet thick films grown by the LPE method are excellent in productivity, most of the garnet thick films have been produced by this method at present.

At present, in communication systems using optical fiber cables, wavelength bands from 1.31 $\mu$m to 1.55 $\mu$m and, further, from 1.6 to 2 $\mu$m have been utilized.

As the material for Faraday rotation devices for near infrared regions used in such wavelength bands, TbBi series garnet thick films and GdBi series (Ga or Al-substituted) garnet thick films prepared by the LPE method have been marketed.

The former material has a small temperature variation coefficient of the Faraday rotation per 45 deg as about 0.04 to 0.06 deg/° C. but the application magnetic field intensity Hs is as high as about 800 to 1200 Oe to require a powerful permanent magnet. The material has a magnetization inversion temperature of about −50° C. or lower and can be used in a wide temperature range.

On the other hand, the latter material has a large temperature variation coefficient of the Faraday rotation per 45 deg as about 0.08 deg/° C., Hs is as small as about 300 Oe, the magnetization inversion temperature is as high as about −10° C. and the working temperature range is near the life environmental temperature.

Accordingly, market's demand has been increased for TbBi series garnet materials having satisfactory temperature characteristics.

However, for rare earth Bi series garnet materials, absorption spectrum attributable to Tb ions appears in a region of a wavelength of 1.6 $\mu$m or longer, as shown in the chart of a literature entitled as "Effect of Impurities on the Optical Properties of Yttrium Iron Garnet" in the Journal of Applied Physics, Vol. 38, No. 3, pp. 1038, and increase of transmission loss in this wavelength region is inevitable in the TbBi garnet material.

On the other hand, for GdBi series (Ga, Al-substituted) garnet thick film, the manufacturing conditions are shown in the literature entitled as "LPE Growth of Bismuth Substituted Gadolinim Gadonium Iron Garnet Layers: Systematization of Experimental Result" in the Journal of Crystal Growth 64 (1983), p. 275, but the literature does not suggest the GdBi series (Yb, Al-substituted) garnet thick film.

It is desirable that the optical isolator shows higher transmittance in the advancing direction and lower transmittance in the direction opposite thereto.

SUMMARY OF THE INVENTION

In view of the above, it is an object of this invention to provide a material for bismuth-substituted garnet thick film capable of avoiding light absorption at a wavelength of about 1.6 $\mu$m inherent to the TbBi series garnet and improving the temperature variation coefficient of the Faraday rotation effect of the GdBi series garnet, as well as a manufacturing method thereof.

It is another object of this invention to reduce the cost by using commercially available substituted gadolinium-gallium-garnet (SGGG) substrate of a large grown substrate diameter.

It is still another object of this invention to provide a Faraday rotation device used in a wavelength region in excess of about 1.5 $\mu$km.

According to one aspect of this invention, there is provided a material for a bismuth substituted garnet thick film which comprises Gd, Yb, Bi, Fe and Al as the main ingredient grown by a liquid phase growing method on a garnet substrate in which the composition of the garnet thick film is represented by the general formula:

$$Gd_{3-x-y}Yb_xBi_yFe_{5-z}Al_zO_{12}$$

($0<x\leqq0.5$, $0.85\leqq y\leqq1.55$ and $0.15\leqq z\leqq0.65$), and each of boron oxide ($B_2O_3$) and lead oxide (PbO) is contained by from 0 to 4.0 wt % (not including 0) in the garnet thick film.

According to another aspect of this invention, there is provided a Faraday rotation device which comprises substantially a garnet thick film comprising Gd, Yb, Bi, Fe and Al as the main ingredient grown by a liquid phase growing method on a garnet substrate. In the Faraday reotation device, the composition of the garnet thick film is represented by the general formula:

$$Gd_{3-x-y}Yb_xBi_yFe_{5-z}Al_zO_{12}$$

($0<x\leqq0.5$, $0.85\leqq y\leqq1.55$ and $0.15\leqq z\leqq0.65$), and each of boron oxide ($B_2O_3$) and lead oxide (PbO) is contained by from 0 to 4.0 wt % (not including 0) in the garnet thick film.

According to still another aspect of this invention, there is provided a method of manufacturing a material for bismuth substituted garnet thick film of growing a garnet thick film comprising Gd, Yb, Bi, Fe and Al by a liquid phase growing method on a garnet substrate. In the present invention, the method includes growing the garnet thick film on a substituted gadolinium—gallium—garnet (SGGG) substrate and the composition of the garnet thick film is represented by the general formula:

$$Gd_{3-x-y}Yb_xBi_yFe_{5-z}Al_zO_{12}$$

($0<x\leqq0.5$, $0.85\leqq y\leqq1.55$ and $0.15\leqq z\leqq0.65$), and each of boron oxide ($B_2O_3$) and lead oxide (PbO) is contained by from 0 to 4.0 wt % (not including 0) in the garnet thick film.

DESCRIPTION OF PREFERRED EMBODIMENTS

Figure 1:
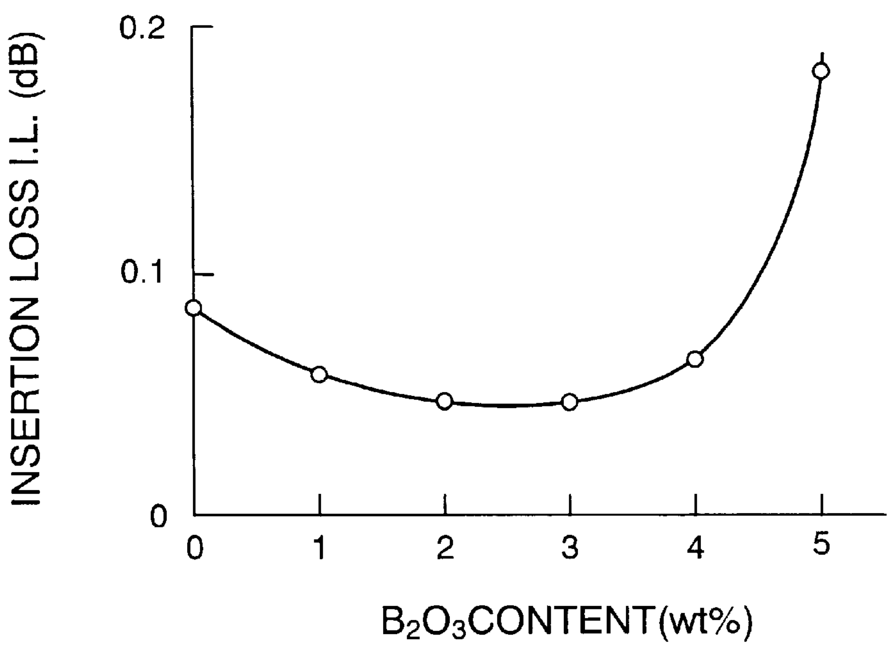
FIG. 1 is a graph showing a relation between a $B_2O_3$ content and an insertion loss (I.L.) in a GdBi series garnet thick film in a first example according to this invention.

Prior to the description of examples according to this invention, principle of the invention will be explained.

The demand for specific characteristics of the GdBi series garnet includes that (1) the material exhibits high transmittance (low insertion loss) in a wavelength region in excess of 1.5 μm, (2) the average variation coefficient $\theta_{F/T}$ of the Faraday rotation within a temperature range of −20° C.–+80° C. per 45 deg shows a better value than that of marketed GdBi series garnet materials (about 0.08 deg/° C.), (3) the magnetization inversion temperature $T_{comp}$ is −20° C. or lower (usable in usual life environmental temperature range) (in this example, since measurement for $T_{comp}$ is difficult at −40° C. or lower, the lower temperature is indicated as −40° C. or lower) and, further, (4) the insertion loss (I.L.) at a thickness where the Faraday rotation angle is about 45 deg is 0.2 dB or less (usually may be 0.3 dB or less) and (5) the required minimum application magnetic field to reach the saturated state (required magnetic field Hs) is 500 Oe or less (enabling the use of the small permanent magnet, which is useful for reducing the cost and minimizing the scale). They are defined as the adaptible range of the garnet material in this invention.

For the Faraday rotation device, larger Faraday rotation effect $\theta_F$ (Faraday rotation angle per unit thickness) can reduce the film thickness of the device. In the LPE method, industrial disadvantages are often caused such as deterioration of crystallinity and increase in the occurrence of cracks as the thickness of the grown film increases.

Accordingly, it is desirable that the Faraday rotation effect $\theta_F$ can be made larger.

The Faraday effect $\theta_F$ of the marketed GdBi series garnet thick films at a wavelength of 1.55 μm is about 800 deg/cm.

Also in this invention, it is desirable that the Faraday rotation effect $\theta_F$ has an equivalent or larger value. The Faraday rotation effect $\theta_F$ can not easily be changed by the change of the simple factors but optimized and attained by the adaptation of various solution or melt compositions and growing conditions.

As a result, the material capable of satisfying the requirements (1)–(5) described above can be obtained to accomplish the present invention by growing a garnet thick film comprising Gd, Yb, Bi, Fe and Al as the main ingredient and containing each of $B_2O_3$ and PbO by 0 to 4.0 wt % (not including 0) by an LPE method, growing the garnet on an SGGG, substituted type gadolinium-gallium-garnet, substrate and subjecting the garnet thick film to a heat treatment in an atmosphere of 10 to 100% oxygen content at a temperature from 950 to 1140° C.

The reasons for defining each of the compositions and various conditions in this invention are to be explained.

In the material for the garnet thick film, the content for each of $B_2O_3$ and PbO is defined as 0 to 4.0 wt % (not including 0) because it has been found that the insertion loss (I.L.) is decreased at the content within the range described above. The effect of reducing the insertion loss by the incorporation of $B_2O_3$ and PbO is supposed to be an effect of conditioning the ionic state of crystal constituent elements in the garnet composition.

By the way in the LPE method, it is desirable that the lattice constant of the substrate and the lattice constant of the garnet thick film are close to each other. Accordingly, an SGGG substrate of lattice constant: about 12.496 Å is used for the TbBi series garnet and an NGG substrate of lattice constant: about 12.509 Å is used for the GdBi series garnet.

However, the maximum diameter of the marketed NGG substrate is 2 inch.

On the other hand, SGGG substrates of 3 inch diameter are marketed.

Accordingly, if it can be grown in the GdBi series garnet SGGG substrate, remarkable reduction of the cost and increase in the production amount can be attained.

Further, in the method of manufacturing the material for the garnet thick film according to this invention, the material for the garnet thick film is heat treated within a range from 950 to 1140° C., because reduction of the insertion loss (I.L.) is recognized within the range, and the homogenization of the composition is insufficient due to low temperature if it is lower than 950° C., while garnet decomposition (evaporation of $Bi_2O_3$) is caused if it exceeds 1140° C.

The reduction of the insertion loss (I.L.) by the heat treatment is attributable to the improvement of homogenization due to diffusion of atoms, i.e. reduction of scattering in the crystal lattice and ion balance.

Further, in the method of manufacturing the material for the garnet thick film according to this invention, the oxygen content in the atmosphere upon heat treatment is 10% or more, because the effect, such as reduction of the insertion loss, is recognized by the heat treatment at such content, while loss of insertion (I.L.) increases at the content of less than 10% due to the insufficiency of oxygen in the garnet.

Change of the characteristics by the compositional value of the main ingredient in the material for the garnet thick film according to this invention has a close concern with the substitution of atoms in the crystal lattice and the magnetic spin and the compositional range in this invention gives an optimum region for the optical characteristics.

The liquid phase growing method (LPE method) for the Bi-substituted garnet for use in the Faraday rotation device used, for example, in optical isolators is conducted as described below.

Garnet ingredients, $Gd_2O_3$, $Yb_2O_3$, $Fe_2O_3$, $Al_2O_3$, etc., are melted using PbO, $Bi_2O_3$, $B_2O_5$ or the like as the flux ingredient at bout 900 to 1100° C. in a platinum crucible to prepare a solution or melt, and then temperature is lowered to attain a super cooled state, i.e. state of super saturated solution. A garnet substrate is immersed in the melt and rotated for a long period of time to grow a thick film of Bi-substituted garnet.

Among the Bi substituted garnets grown as described above, the GdBi series garnet has a feature of having a relatively high Faraday rotation effect $\theta_F$ and that the required magnetic field applied to garnet may be small. The necessary application magnetic field, i.e. required magnetic field Hs, is a magnetic field necessary to reach the minimized the insertion loss of garnet. Physically, this is a magnetic field necessary for aligning the magnetic spins of garnet in one direction.

Generally, the applied magnetic field is adapted to be supplied from a permanent magnet disposed at the periphery of a garnet film. Accordingly, if the saturation magnetization 4 π Ms of the garnet film is low, Hs is also lowered and the characteristics of the magnet used can be lowered. At the same time, it is possible to reduce the size the weight, which is industrially useful.

Then, examples of this invention are to be explained with reference to the drawings.

FIRST EXAMPLE

GdBi series garnet films each of a composition comprising about 0.5 wt % of PbO, with the main ingredient ratio of $Gd_{1.4}Yb_{0.3}Bi_{1.3}Fe_{4.4}Al_{0.6}O_{12}$ and containing $B_2O_3$ by 0, 1, 2, 3, 4 and 5 wt % were grown to a thickness of about 500 μm using powders of gadolinium oxide ($Gd_2O_3$), ytterbium oxide ($Yb_2O_3$), ferric oxide ($Fe_2O_3$), aluminum oxide ($Al_2O_3$), bismuth oxide ($B_2O_3$), lead oxide (PbO) and boron oxide ($B_2O_3$) at high purity as the starting material and using a PbO—$Bi_2O_3$—$B_2O_3$ system flux by the LPE method on an SGGG substrate of lattice constant, about 12.496 Å.

Then, the substrates for the specimens were removed, both surfaces were polished to such a thickness that the Faraday rotation angle at a wavelength of 1.55 μm was about 45 deg.

The composition described above was determined as an average value of EPMA analysis conducted for both surfaces of these specimens each at five points. It was determined for $B_2O_3$ by conducting atomic absorption analysis to the specimen.

Then, after applying non-reflection coating of an $SiO_2$ film on the specimen plates, a magnetic field was applied up to about 0.5 kOe by using an electromagnet to determine the minimum application magnetic field at which the permeability reaches saturation, i.e. required magnetic field Hs, insertion loss (I.L.), the Faraday rotation effect $\theta_F$ and the temperature variation coefficient $\theta_{F/T}$ of the Faraday rotation per 45 deg ($\theta_{F/T}$) at −20° C. to +80° C.

As a result, Hs was about 400 Oe, $\theta_F$ was about 1200 deg/cm, $\theta_{F/T}$ was about 0.06 deg/° C. and $T_{comp}$ was −40° C. or lower for all specimens.

The relation between the insertion loss (I.L.) and the $B_2O_3$ content is as shown in FIG. 1.

As can be seen from FIG. 1, while the insertion loss (I.L.) decreases by the incorporation of $B_2O_3$ but it remarkably increase in a region in excess of 4.0 wt %. From the foregoings, the range from 0 to 4.0 wt % (not including 0) is effective for the reducing effect of the insertion loss (I.L.). A range from 1 to 3.2 wt % is particularly preferred.

SECOND EXAMPLE

In the same manner as in the first example, after growing GdBi series garnet films each of a composition containing $B_2O_3$ by about 0.5 wt %, having an ingredient ratio of $Gd_{1.7}Yb_{0.2}Bi_{1.1}Fe_{4.6}A_{10.4}O_{12}$ and containing 0, 1, 2, 3, 4 and 5 wt % of PbO to a thickness of about 600 μm, specimens were prepared and characteristics were measured.

As a result, Hs was about 400 Oe, $\theta_F$ was about 1100 deg/cm, $\theta_{F/T}$ was about 0.06 deg/° C. and $T_{comp}$ was −40° C. or lower for all specimens.

Figure 2:
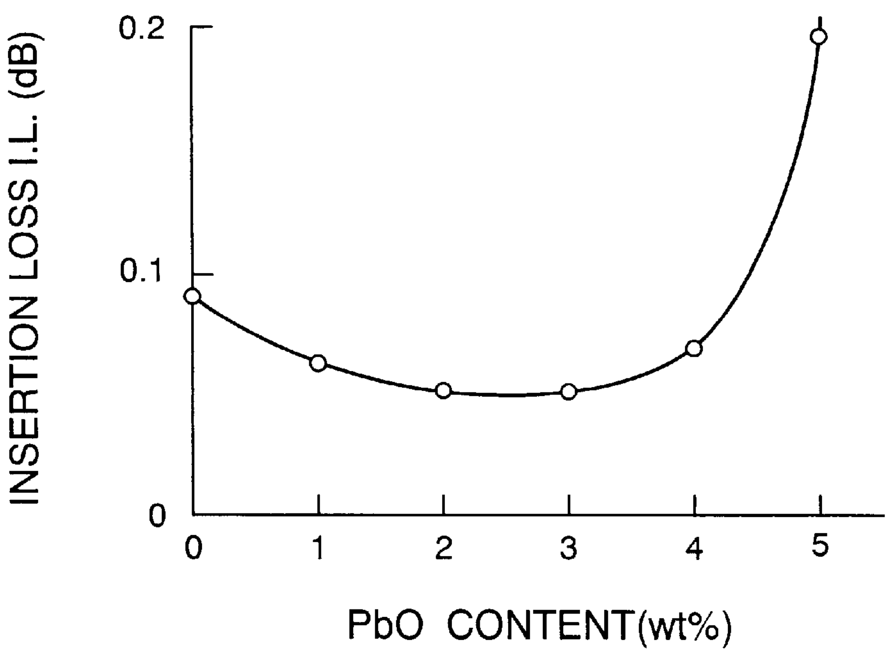
FIG. 2 is a graph showing a relation between a PbO content and an insertion loss (I.L.) in a GdBi series garnet thick film in a second example according to this invention.

As can be seen from FIG. 2, the insertion loss (I.L.) is decreased by the incorporation of PbO and it remarkably increases in a region in excess of 4.0 wt % of PbO.

Accordingly, a range for PbO content from 0 to 4.0 wt % (not including 0) can be said to be useful. More preferably, by making the PbO content within a range from 0.4 to 4.0 wt %, the insertion loss (I.L.) can be reduced to 0.08 dB or less. A range for 1.0 to 4.0 wt % is particularly preferred.

THIRD EXAMPLE

In the same manner as in the first example, a garnet film having a main ingredient ratio of $Gd_{1.1}Yb_{0.4}Bi_{1.5}Fe_{4.4}Al_{0.6}O_{12}$ and containing about 0.7 wt % of $B_2O_3$ was grown to a thickness of about 500 μm.

Then, the specimen were kept at each of temperatures of 950° C., 1000° C., 1050° C., 1100° C., 1130° C. and 1150° C. for 10 hours to apply heat treatment.

After polishing both surfaces of the specimens to adjust the thickness such that the Faraday rotation angle at a wavelength of 1.55 μm was about 45 deg, measurement was conducted.

As a result, Hs was about 300 Oe, $\theta_F$ was about 1400 deg/cm, $\theta_{F/T}$ was about 0.05 deg/° C. and $T_{comp}$ was −40° C. or lower for all specimens.

Figure 3:
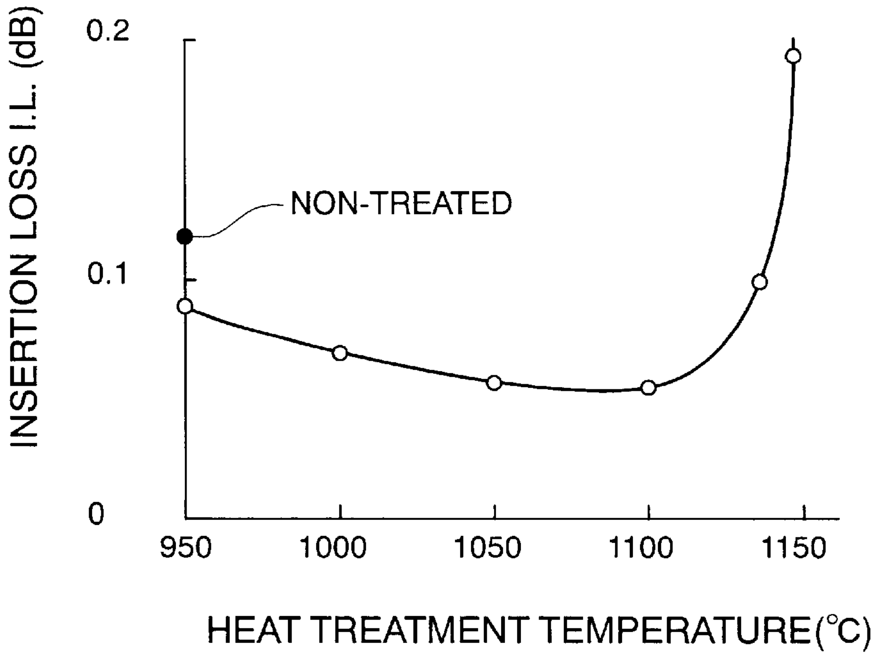
FIG. 3 is a graph showing a relation between a heat treatment temperature and an insertion loss (I.L.) in a GdBi series garnet thick film in a third example according to this invention.

Further, the relation between the insertion loss (I.L.) and the heat treatment temperature is as shown in FIG. 3.

From FIG. 3, the effect of reducing the insertion loss (I.L.) is observed by the heat treatment within the range of heat temperature from 950 to 1140° C. Accordingly, it can be said that the heat treatment within a temperature range from 950 to 1140° C. can be said to be useful.

FOURTH EXAMPLE

In the same manner as in the first example, a garnet film having a main ingredient ratio of $Gd_{2.0}Yb_{0.1}Bi_{0.9}Fe_{4.8}Al_{0.2}O_{12}$ and containing $B_2O_3$ by about 0.5 wt % and PbO by about 1.5 wt % was grown to a thickness of about 700 μm.

Then, the specimens were heat treated at a temperature of 1050° C. and an oxygen concentration in the atmosphere of 0, 10, 20, 40, 60, 80 and 100% and keeping for 20 hours, specimens were prepared and characteristics were measured.

As a result, Hs was about 500 Oe, $\theta_F$ was about 900 deg/cm, $\theta_F$ was about 0.07 deg/° C. and $T_{comp}$ was −40° C. or lower.

Figure 4:
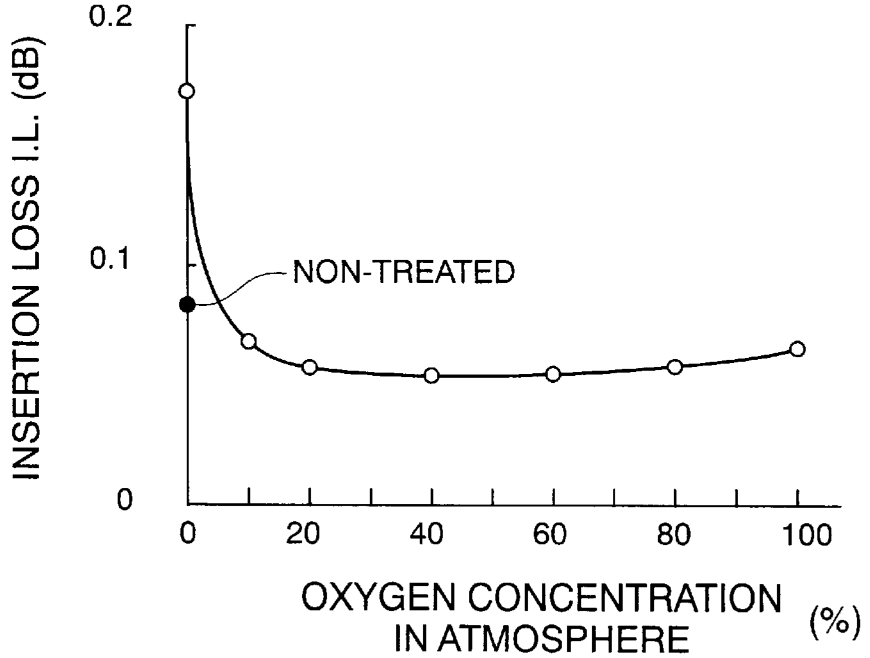
FIG. 4 is a graph showing a relation between an oxygen concentration in a heat treatment atmosphere and an insertion loss (I.L.) in a GdBi series garnet thick film in a fourth example according to this invention.

Further, the relation between the insertion loss (I.L.) and the oxygen concentration in the heat treatment temperature is as shown in FIG. 4.

From FIG. 4, the effect of reducing the insertion loss (I.L.) by the heat treatment can be recognized within a range of the oxygen concentration in the heat treatment temperature atmosphere from 10 to 100%. Accordingly, it can be said that 10 to 100% of oxygen concentration in the heat treatment atmosphere can be said to be useful.

FIFTH EXAMPLE

In the same manner as in the first example, garnet films containing about 0.5 wt % of $B_2O_3$ and about 1 wt % of PbO and with the main ingredient At ratio of: $Gd_{1.7}Yb_{0.2}Bi_{1.1}Fe_{5-z}Al_zO_{12}$ in which z=0.1, 0.2. 0.3, 0.4, 0.5, 0.6 and 0.7 were grown to a thickness of about 600 μm, specimens were prepared and an characteristics were measured.

As a result, $\theta_F$ was about 1100 deg/cm and $T_{comp}$ was −40° C. for all specimens.

Figure 5A:
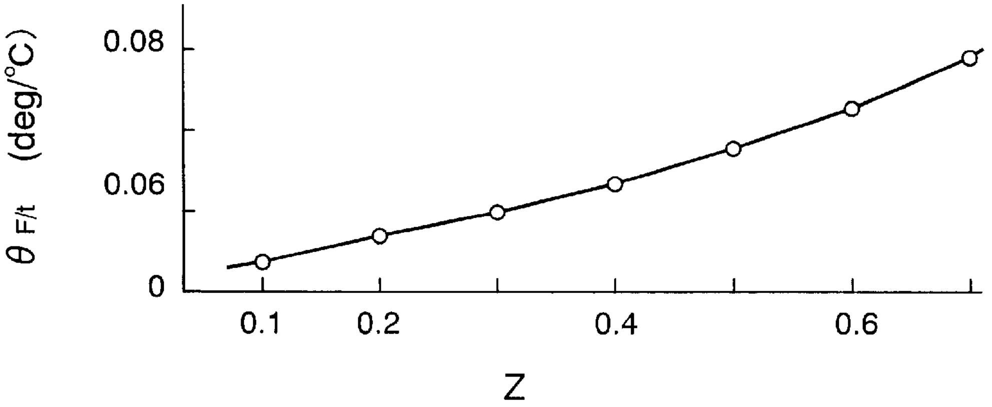
FIG. 5A is a graph showing a relation between $\theta_{F/T}$ and z for the dependence of the optical and magnetic characteristics on the composition z in a GdBi series garnet thick film of a fifth example according to this invention.
Figure 5B:
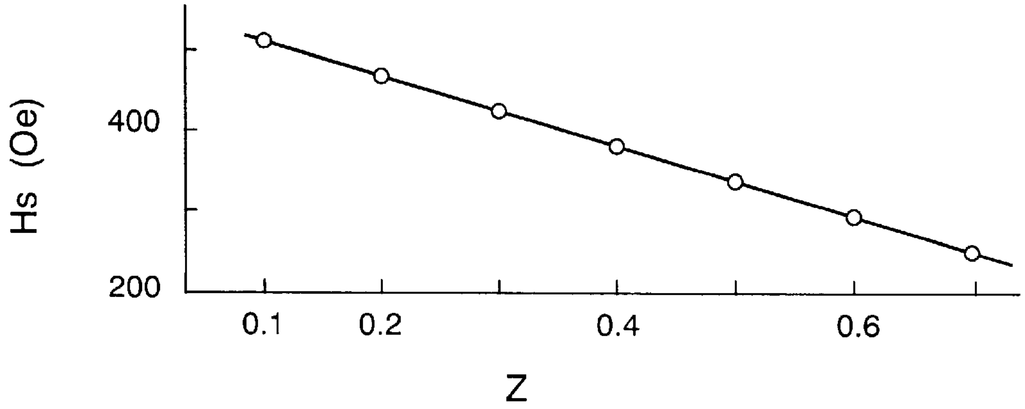
FIG. 5B is a graph showing a relation between Hs and z for the dependence of the optical and magnetic characteristics on the composition z in a GdBi series garnet thick film of a fifth example according to this invention.

Relations between $\theta_{F/T}$, and Hs and z are shown, respectively, in FIG. 5A and FIG. 5B.

Hs of 500 Oe or less and $\theta_{F/T}$ of 0.08 deg/° C. or lower were obtained within the range of z from 0.15 to 0.65.

SIXTH EXAMPLE

In the same manner as in the first example, garnet films containing about 0.5 wt % of $B_2O_3$ and about 11 wt % of PbO and with the main ingredient ratio of: $Gd_{1\text{-}9\text{-}x}Yb_xBi_{1.1}Fe_{4.6}Al_{0.4}O_{12}$ in which x=0, 0.1, 0.2. 0.3, 0.4, 0.5 and 0.6 were grown to a thickness of about 600 μm, specimens were prepared and characteristics were measured.

As a result, $\theta_F$ was about 1100 deg/cm and $T_{comp}$ was −40° C. or less for all specimens.

Figure 6:
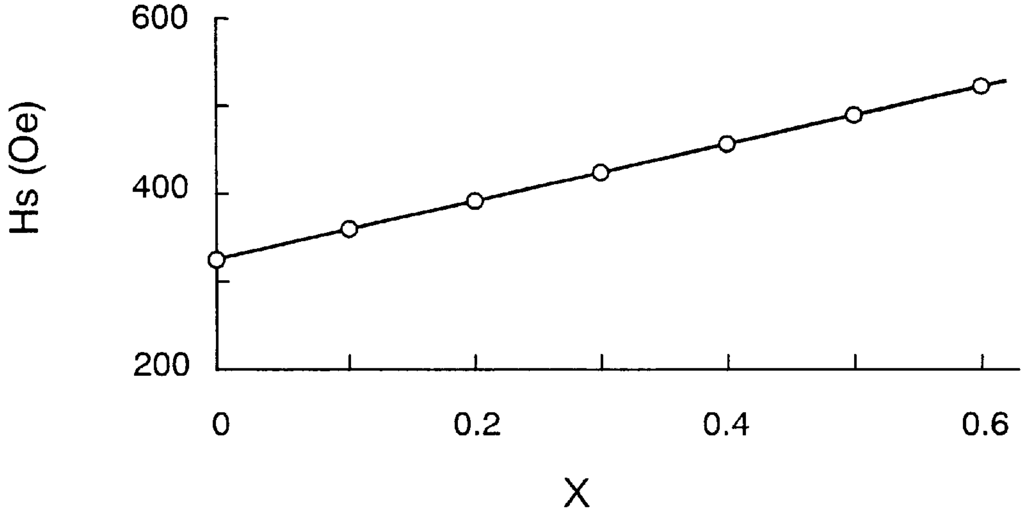
FIG. 6 is a graph showing a relation between a composition x and Hs in a GdBi series garnet thick film of a sixth example according to this invention.

Relation between Hs and x is shown in FIG. 6. Hs of 500 Oe or less was obtained for the range of z from 0 to 0.5.

SEVENTH EXAMPLE

In the same manner as in the first example, garnet films containing about 0.5 wt % of $B_2O_3$ and about 1 wt % of PbO and with the main ingredient ratio of: $(Gd_{1.7}Yb_{0.2})_{(3-y)/1.9}Bi_yFe_{4.6}Al_{0.4}O_{12}$ in which y=0.8, 0.9, 1.0, 1.1, 1.2, 1.3, 1.4, 1.5 and 1.6 were grown to a thickness of about 600 μm, specimens were prepared and characteristics were measured.

As a result, $T_{comp}$ was −40° C. or less and $\theta_{F/T}$ was from 0.06 to 0.076 deg/° C.

Figure 7A:
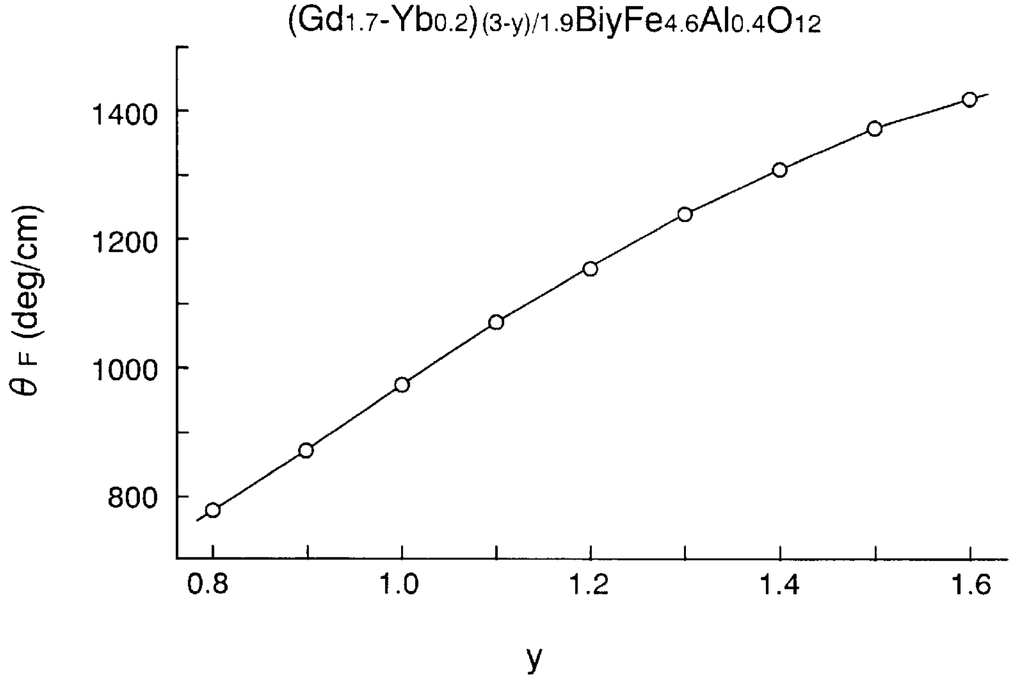
FIG. 7A is a graph showing a relation between $\theta_{F/T}$ and y for the dependence of the optical and magnetic characteristics on the composition y in a GdBi series garnet thick film of a seventh example according to this invention.
Figure 7B:
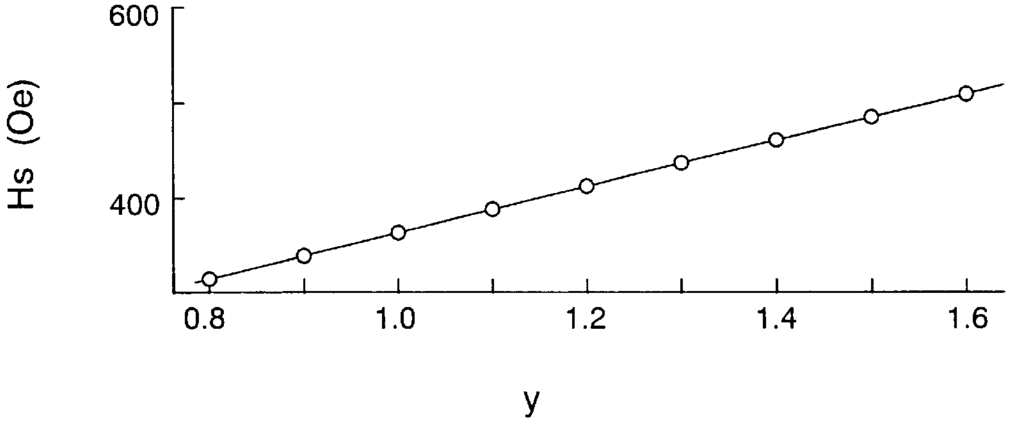
FIG. 7B is a graph showing a relation between Hs and z for the dependence of the optical and magnetic characteristics on the composition y in a GdBi series garnet thick film of a seventh example according to this invention.

Relations between the obtained $\theta_F$, and Hs and y are shown, respectively, in FIG. 7A and FIG. 7B.

$\theta_F$ of 800 deg/cm or more and Hs of 500 Oe or less were obtained for the range of y from 0.85 to 1.55.

As has been described above, according to this invention, absorption at a wavelength of about 1.6 μm or more inherent to the TbBi series garnet is avoided and it can provide a material for a bismuth substituted garnet thick film improved with the temperature variation coefficient or the Faraday rotation effect of the GdYbBi series garnet, as well as a manufacturing method thereof.

Further, according to this invention, a Faraday rotation device to be used in a wavelength region in excess of about 1.5 μm can be provided.

What is claimed is:

1. A material for a bismuth substituted garnet thick film comprising Yb, Bi, Fe and Al as the main ingredient grown by a liquid phase growing method on a garnet substrate in which the composition of the garnet thick film is represented by the general formula:

$$Gd_{3-x-y}Yb_xBi_yFe_{5-z}Al_zO_{12}$$

(0<x≦0.5, 0.85≦y≦1.55 and 0.15≦z≦0.65), and each of boron oxide ($B_2O_3$) and lead oxide (PbO) is contained by from 0 to 4.0 wt % (not including 0) in the garnet thick film.

2. A material for bismuth substituted garnet thick film as defined in claim 1, wherein the garnet thick film is subjected to a heat treatment at a temperature within a range from 950 to 1140° C.

3. A Faraday rotation device substantially comprising a garnet thick film comprising Gd, Yb, Bi, Fe and Al as the main ingredient grown by a liquid phase growing method on a garnet substrate, wherein the composition of the garnet thick film is represented by the general formula:

$$Gd_{3-x-y}Yb_xBi_yFe_{5-z}Al_zO_{12}$$

(0<x≦0.5, 0.85≦y≦1.55 and 0.15≦z≦0.65), and each of boron oxide ($B_2O_3$) and lead oxide (PbO) is contained by from 0 to 4.0 wt % (not including 0) in the garnet thick film.

4. A Faraday rotation device as defined in claim 3, wherein the garnet thick film is subjected to a heat treatment at a temperature within a range from 950 to 1140° C.

5. A method of manufacturing a material for bismuth substituted garnet thick film of growing a garnet thick film comprising Gd, Yb, Bi, Fe and Al by a liquid phase growing method on a garnet substrate, wherein the method includes growing the garnet thick film on a substituted gadolinium-gallium-garnet (SGGG) substrate and the composition of the garnet thick film is represented by the general formula:

$$Gd_{3-x-y}Yb_xBi_yFe_{5-z}Al_zO_{12}$$

(0<x≦0.5, 0.85≦y≦1.55 and 0.15≦z≦0.65), and each of boron oxide ($B_2O_3$) and lead oxide (PbO) is contained by from 0 to 4.0 wt % (not including 0) in the garnet thick film.

6. A method of manufacturing a material for a bismuth substituted garnet thick film as defined in claim 5, which further comprises a step of subjecting the garnet thick film to a heat treatment at a temperature within a range from 950 to 1140° C.

7. A method of manufacturing material for a bismuth substituted garnet thick film as defined in claim 6, wherein the oxygen content of the atmosphere during the heat treatment is within a range from 10 to 100%.

* * * * *